United States Patent [19]
Bendell

[11] 4,379,310
[45] Apr. 5, 1983

[54] IMAGE TUBE SUPPRESSION CIRCUIT

[75] Inventor: Sidney L. Bendell, Riverton, N.J.

[73] Assignee: RCA Corporation, New York, N.Y.

[21] Appl. No.: 831,944

[22] Filed: Sep. 9, 1977

[30] Foreign Application Priority Data

Mar. 21, 1977 [GB] United Kingdom ............... 11902/77

[51] Int. Cl.³ .................. H04N 5/19; H04N 5/34; H01J 31/26; H01J 29/52
[52] U.S. Cl. .................................. 358/219; 358/223; 315/10; 315/383
[58] Field of Search ............... 358/218, 219, 223, 243; 315/10, 383

[56] References Cited

U.S. PATENT DOCUMENTS 3,548,250 12/1970 Van Roosmalen et al. ...... 315/31 T
3,610,823 10/1971 Whenen et al. ...................... 358/219
3,955,116 5/1976 Van Den Berg ............... 358/223 X Primary Examiner—Aristotelis M. Psitos
Attorney, Agent, or Firm—E. M. Whitacre; P. J. Rasmussen; W. H. Meise

[57] ABSTRACT

A suppression circuit processes the video signal from an anti-comet tail (ACT) image pickup tube and develops a control signal indicative of illumination highlights exceeding a predetermined level. The control signal is coupled through ACT pulsing circuits to the control elements of the ACT image pickup tube to automatically enable the beam control element pulsing so as to increase the beam current only in the presence of an illumination highlight to force the recharging of the target to cathode potential in the area of the highlight.

9 Claims, 4 Drawing Figures

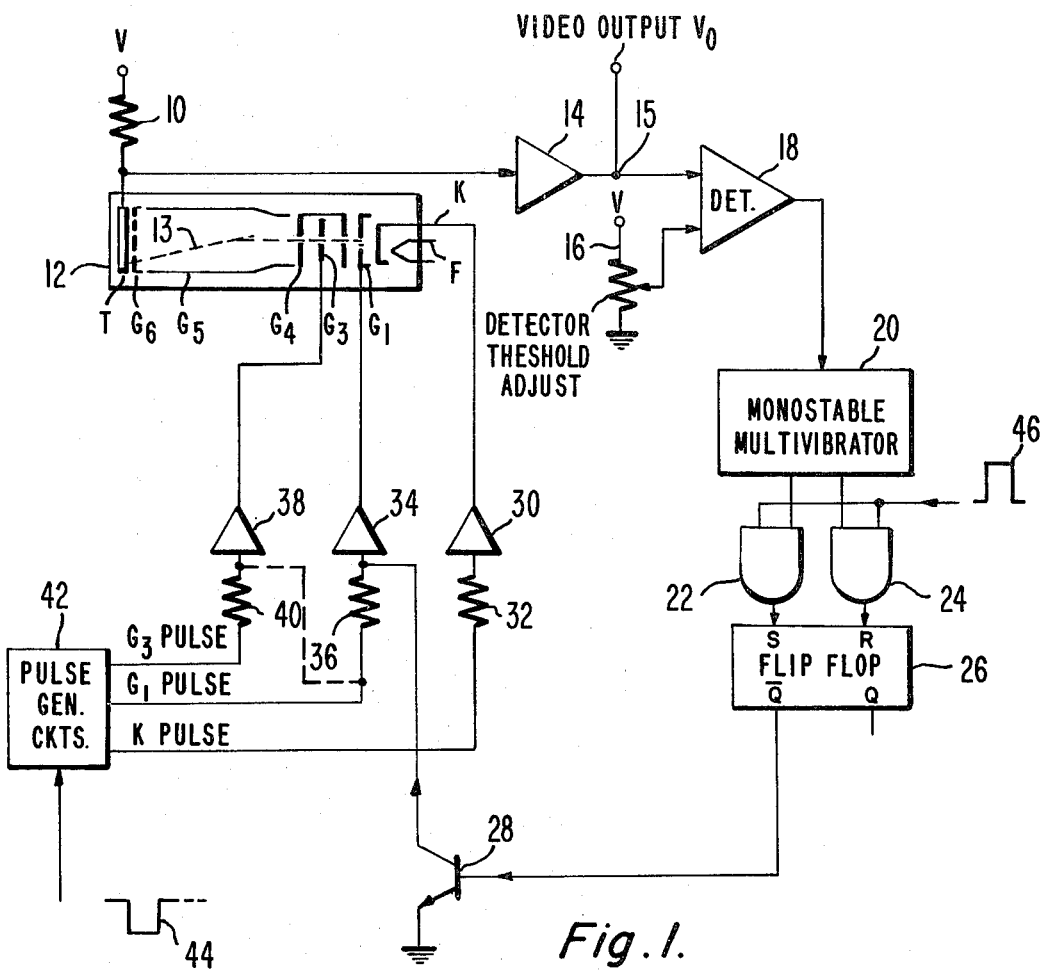
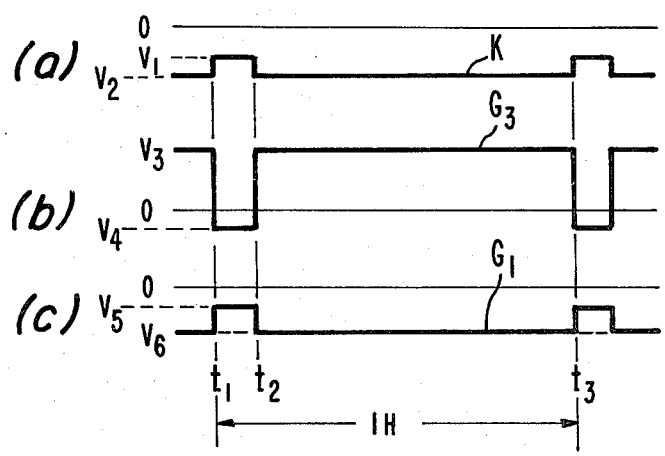
Fig. 1.
Fig. 2.

IMAGE TUBE SUPPRESSION CIRCUIT

BACKGROUND OF THE INVENTION

This invention relates to television camera systems in which a video signal is developed from one or more image pickup tubes and, in particular, to suppression circuits for eliminating from the video signal developed by the image pickup tubes the effect of illumination highlights present in the scene being viewed.

Modern day television cameras include one or more image pickup tubes for developing a video signal from the scene being viewed. The image pickup tube generally comprises an electron gun assembly for generating an electron beam which is used to scan a photoconductive target on which the light from the scene is imaged. Beam deflection coils placed around the pickup tube and driven by horizontal and vertical rate signal waveforms cause the electron beam to scan a raster on the photoconductive target to develop a video signal representative of the scene as the electron beam recharges the photoconductive target to cathode potential.

Image pickup tubes utilizing a photoconductive target on which the light from a scene is imaged, as described above, may develop levels of target voltage modulation, upon exposure to above normal illumination highlights in the scene, that cannot be recharged fully by the normal steady state beam current which is used to develop the output video signal from the image pickup tube by recharging the photoconductive target. Where the highlight exposure is relatively intense, for example, as illustrated by a point source of light in the scene, many passes or scans of the target by the beam will be required for complete recharge of the target. If the highlight in question is moving, an effect known as comet-tailing results in which the moving highlight is trailed by a tail of light. In a color camera system, the comet-tailing is particularly troublesome since the comet tails may flare up as spurious bright colors in the final display not related to the highlight or scene background. One approach to eliminating the comet-tailing effect has resulted in the development and use of an anti-comet tail (ACT) image pickup tube. In an ACT pickup tube, the electron gun utilized to form the electron beam includes a special electrode (auxiliary grid) in the form of a segmental cone placed between the gun cathode and lens electrodes. During the horizontal flyback period, the gun electrodes are pulsed under control of pulse generator circuits so as to change the focussing of the beam through the lens electrodes in a manner to significantly increase the beam current during each horizontal retrace period for recharging the target electrode, thereby eliminating the excessively discharged target areas which create the comet tails.

ACT image pickup tubes of the form described above, although successfully minimizing the comet-tailing due to illumination highlights, do have a serious disadvantage in terms of a shortened operating life. This is due primarily to the effect of the increased beam current during the flyback or retrace period which effectively decreases the cathode life and adversely affects the life and performance of the photocathode target electrode. An ACT image tube may also be operated in a non-anti-comet tail mode which will extend the pickup tube life. The present invention utilizes the advantages of both modes of operation of a ACT image pickup tube, thus avoiding the disadvantages by providing an image suppression circuit which automatically provides normal ACT image pickup tube pulsing "on demand", that is, only in the presence of illumination highlights, thereby significantly extending the operating life of the ACT pickup tube, while advantageously utilizing the anti-comet tail features of the pickup tube.

SUMMARY OF THE INVENTION

A beam control circuit is provided for suppressing illumination highlights effects in a video output signal of a scene being received by an anti-comet tail (ACT) image pickup tube. The image pickup tube includes a cathode and beam control elements for controlling an electron beam used to scan a target electrode in vertical and horizontal directions. The scanning of the target electrode produces an electrical output signal in the form of a video signal representative of the scene being received by the image pickup tube by recharging the target electrode. The circuit comprises detector means coupled to the image pickup tube for comparing the electrical output signal with a first reference signal for developing a detector output control signal in the presence of illumination highlights exceeding a predetermined level. First control means are responsive to the detector output control signal and a timing reference signal for developing a timed control signal. Second control means operable in first and second states and responsive to the timed control signal are coupled to at least one of the beam control elements so as to disable the beam control elements pulsing in the absence of illumination highlights in the first state and to enable the beam control element pulsing in the second state.

BRIEF DESCRIPTION OF THE DRAWINGS

FIG. 1 is a block diagram partially in schematic form of a system embodying the present invention; and FIGS. 2a-2c illustrate waveforms depicting the operation of the system of FIG. 1.

DESCRIPTION OF THE INVENTION

In FIG. 1, an image pickup tube 12 is shown in diagrammatic form having a filament F for heating a thermionic cathode K to produce an electron beam 13. Control electrodes $G_1$, $G_3$ (auxiliary grid) and $G_4$ provide the electron optics necessary to shape and direct electron beam 13 toward the target T. The line and field deflection coils as well as the operating potential sources for the recited elements of pickup tube 12 not necessary for an understanding of the invention have been omitted. The target T, which comprises a transparent conductive plate covered by a photoconductive layer, forms a myriad of capacitors on which the light from the scene is imaged. The photoconductive layer is energized by a potential V coupled to the photoconductive layer by means of resistor 10. As the electron beam is scanned over the target assembly by the horizontal and vertical deflection fields, the beam recharges the capacitor formed by the target layer that was discharged by the incoming light, thereby modulating the current in resistor 10. The junction of target electrode T and resistor 10 provides a pickup tube signal output terminal, which is, in turn, coupled to the input terminal of a video processing amplifier 14. The output terminal 15 of video amplifier 14 provides a video output signal $V_0$ which is further processed within the camera system and subsequent studio apparatus for transmission to the viewer. Image pickup tube 12 is further illustrated as arranged in a known current configuration for ACT operation in which pulse generating circuits 42 generate pulses under the influence of a horizontal drive (retrace) pulse 44. The pulse output of pulse generating circuits 42, shown as $G_3$ pulse, $G_1$ pulse, and K pulse, are coupled to their respective electrodes in image pickup tube 12 by resistors and amplifiers 40, 38; 36, 34; and 32, 30. The output terminal 15 of amplifier 14 is further coupled to one input of a threshold detector 18. The other input of detector 18 is coupled to a source of reference potential comprising an adjustable resistor 16 coupled to a source of potential V. The output of detector 18 is applied to a timing/control means including retriggerable monastable multivibrator 20, gates 22 and 24, flip-flop 26 and control transistor 28. The output of detector 18 is coupled to the input terminal of the retriggerable monostable multivibrator 20, whose low and high signal output terminals are coupled to one input each of gates 22 and 24, respectively. The other input of gates 22 and 24 are coupled to a timing reference signal 46 arranged to occur during the vertical blanking interval of the target scanning. The output terminals of gates 22 and 24 are coupled to the set (S) and reset (R) input terminals of a set-reset flip-flop 26. The Q or high output of flip-flop 26 is, in turn, coupled to the input (base) of a control transistor 28. The emitter of transistor 28 is coupled to a point of reference potential (ground), and the collector of transistor 28 is coupled to amplifier 34 at the junction of resistor 36 and the input terminal of amplifier 34.

In operation, a positive-going highlight signal appearing in the output video signal $V_0$ and at the input of comparator-amplifier 18 due to an illumination highlight exceeding the threshold level determined by the setting of potentiometer 16 causes an output signal from comparator-amplifier 18 to be applied to the input of retriggerable monostable multivibrator 20, which changes the state of its normally low and high output signals. The turn-off time of multivibrator 20, which is of integrated circuit form, is adjustable, typically by means of an external resistor and capacitor and may be set to last for several seconds or any desired period of time following the occurrence of the highlight. The low and high levels of multivibrator 20 are coupled by means of gates 22 and 24 to the set and reset terminals of flip-flop 26, where the change in output status of multivibrator 20 causes the $\overline{Q}$ output to go low and the Q output to go high, thus disabling control transistor 28, which restores $G_1$ electrode pulses for the ACT mode of operation, wherein the ACT pulsing of the beam control elements occurs during the retrace portion of the horizontal deflection cycle of pickup tube 12. In order to prevent switching transients from occurring during the horizontal scanning time, a timing reference signal 46, derived during the vertical blanking interval, enables gates 22 and 24 only during the vertical retrace portion of the target scanning so that the output status of multivibrator 20, which controls the status of flip-flop 26, can only be coupled to flip-flop 26 during the vertical blanking interval. FIGS. 2a, 2b and 2c illustrate typical waveforms (not to scale) for the operation of the circuit of FIG. 1 for one horizontal period of 1H of duration $t_1-t_3$ in both the ACT and NON-ACT modes of operation. FIG. 2a illustrates a normal cathode bias potential $V_2$, which is raised by the pulse circuit 42 to a potential $V_1$ during the horizontal retrace period $t_1-t_2$. Similarly, FIG. 2b illustrates the normal $G_3$ bias of $V_3$ and the pulsed bias level of $V_4$ during the period $t_1-t_2$. FIG. 2c illustrates the normal $G_1$ bias of $V_6$, which is not pulsed, as shown by the dotted portion of waveform 2c at $t_1-t_2$, due to the operation of flip-flop 26 and control transistor 28 in the absence of an illumination highlight. The occurrence of an illumination highlight, as described above, disables transistor 28 and allows pulsing of the $G_1$ electrode to resume, as illustrated by the $G_1$ bias potential being pulsed, to a level $V_5$.

In normal operation, typical values for potential $V_1$ to $V_6$ are as follows:
 $V_1$: −40 V
 $V_2$: −45 V
 $V_3$: +280 V
 $V_4$: 32 V
 $V_5$: −25 V to −125 V
 $V_6$: −50 V to −150 V The range of values for $V_6$ of −50 V to −150 V depends largely on the desired beam current setting for the image pickup tube operation. As illustrated in FIG. 1 and described above, the removal of the $G_1$ pulsing, except on demand in the presence of an illumination highlight, reduces the resulting gun beam current by a factor of at least ten times, and this effectively turns off the ACT erase action. The resulting lower beam current is so reduced as to have a negligible effect on the pickup tube life. Although the on demand pulsing is illustrated in conjunction with electrode $G_1$, it is equally possible to practice the invention by controlling the pulsing on other electrodes, for example, the special erase electrode $G_3$; as shown by dashed lines in FIG. 1 however, the $G_3$ pulse amplitude at the $G_3$ electrode is approximately 300 V, while the pulse amplitude at the $G_1$ electrode is approximately 25 volts. Since only one electrode need be controlled in accordance with the invention, selection of the $G_1$ electrode for controlled pulsing minimizes the possibility of signal disturbances, particularly in the video output signal.

The invention insofar as described, depicts the operation with a single image pickup tube, as would be the application in a monochrome camera system. The invention is readily and advantageously adapted to a color camera system in the following manner. As previously mentioned in a color camera, the incoming light from the scene is optically split into one or more color components, which are imaged onto individual image pickup tubes. Since the light reaching each of the image pickup tubes is from the same light source, an illumination highlight in the scene will simultaneously appear at the same relative position in all three image tubes. Therefore, a control signal indicating an illumination highlight derived from any one of the multiple image pickup tubes can be utilized to enable the beam current control element pulsing in all of the pickup tubes at the same time, for example, by coupling the $\overline{Q}$ output of flip-flop 26 to the pulse generating circuits of each of the other image pickup tubes by means of additional control transistors, such as transistor 28.

What is claimed is:

1. A tube circuit for automatically enabling the excessive highlight suppression mode of operation of a camera pickup tube in response to a video signal level indicative of excessive highlights in the viewed scene, wherein the pickup tube includes a tube target and an electrode configuration with a control grid, an auxiliary grid, and a cathode, adapted to generate a high intensity beam for bombarding the tube target during the line flyback period, comprising the combination of:

highlight detector means coupled to the tube target and including threshold means for automatically generating an enable command only in response to the existence of excessive highlights; and control/timing means coupled to the highlight detector means for generating and introducing selected signals to the control grid, the auxiliary grid and the cathode in response to the enable command to increase the scanning beam to said high intensity during a selected portion of the line flyback periods, and thus to enable the excessive highlight suppression mode of operation of the pickup tube only in response to the excessive highlights.

2. A beam control circuit for suppressing illumination highlights effects in a video output signal of a scene being received by an anti-comet tail image pickup tube, said image pickup tube including a cathode and beam control elements for controlling an electron beam used to scan a target electrode in vertical and horizontal directions in response to vertical and horizontal timing signals, said scanning producing an electrical output signal in the form of a video signal representative of the scene being received by said image pickup tube by recharging said target electrode, said cathode and said beam control elements being pulsed during the retrace portion of the horizontal deflection cycle so as to increase said recharging of said target electrode, comprising:

detector means coupled to said image pickup tube and responsive to the output therefrom exceeding a predetermined level indicative of illumination highlights for providing a detector output control signal in the presence of illumination highlights;

first control means responsive to said detector output control signal and said vertical timing signal for developing a timed control signal that begins at the vertical retrace interval following detection of highlights; and second control means responsive to said timed control signal to operate in first and second states coupled to at least one of said beam control elements so as to disable said beam control element pulsing in the absence of illumination highlights in said first state and to enable said beam control element pulsing in said second state at a time that begins during the vertical retrace interval.

3. A beam control circuit as claimed in claim 2 wherein said first control means includes means responsive to said detector output control signal for terminating said timed control signal a predetermined time period following the termination of said detected highlights.

4. The combination claimed in claim 3 wherein said predetermined time period is several seconds.

5. The combination claimed in claim 3 wherein said first control means comprises a retriggerable monostable multivibrator coupled to said detector means and having a time constant for providing a delay turnoff time following the termination of detected highlights.

6. The combination claimed in claim 5 wherein said first control means includes gating means coupled to said multivibrator and responsive to said vertical timing signal for developing said time control signal.

7. A beam control circuit for suppressing illumination highlights effects in a video output signal of a scene being received by an anti-comet tail image pickup tube, said image pickup tube including a cathode and beam control elements for controlling an electron beam used to scan a target electrode in vertical and horizontal directions, said scanning producing an electrical output signal in the form of a video signal representative of the scene being received by said image pickup tube by recharging said target electrode, pulsing means coupled to said cathode and said beam control elements for pulsing said element during the retrace portion of the horizontal deflection cycle so as to increase said recharging of said target electrode, comprising:

highlight detector means coupled to said image pickup tube and responsive to the output therefrom exceeding a predetermined level indicative of illumination highlights for providing a detector output control signal in the presence of illumination highlights;

control/timing means coupled to said highlight detector means and said pulsing means and responsive to said detector output control signal for generating and introducing pulsing control signals to said pulsing means to disable pulsing to at least one of said cathode and beam control elements in the absence of illumination highlights and enable said pulsing to said one element in the presence of illumination highlights.

8. A tube circuit for automatically enabling the excessive highlight suppression mode of operation of a camera pickup tube in response to a video signal level indicative of excessive highlights in the viewed scene, wherein the pickup tube includes a tube target and an electrode configuration with a control grid, an auxiliary grid, and a cathode, adapted to generate a high intensity beam for bombarding the tube target during the line flyback period, comprising the combination of:

highlight detector means coupled to the tube target and including threshold means for automatically generating an enable command only in response to the existence of excessive highlights; and control/timing means coupled to the highlight detector means for generating and introducing selected signals to at least one of the control grid and the cathode in response to the enable command to increase the scanning beam to said high intensity during a selected portion of the line flyback periods, and thus to enable the excessive highlight suppression mode of operation of the pickup tube only in response to the excessive highlights.

9. A tube circuit for automatically enabling the excessive highlight suppression mode of operation of a camera pickup tube in response to a video signal level indicative of excessive highlights in the viewed scene, wherein the pickup tube includes a tube target and an electrode configuration with a control grid, an auxiliary grid, and a cathode, adapted to generate a high intensity beam for bombarding the tube target during the line flyback period, comprising the combination of:

highlight detector means coupled to the tube target and including threshold means for automatically generating an enable command only in response to the existence of excessive highlights; and control/timing means coupled to the highlight detector means introducing a selected signal to one of the grids in response to the enable command to increase the scanning beam to said high intensity during the line flyback period, and thus to enable the excessive highlight suppression mode of operation of the pickup tube only in response to the excessive highlights.

* * * * *